United States Patent [19]

Scrabis et al.

[11] Patent Number: 4,711,755
[45] Date of Patent: Dec. 8, 1987

[54] HANDLING TOOL FOR, AND METHOD OF USE OF, ICE BASKET REMOVABLE CRUCIFORM

[75] Inventors: Charles M. Scrabis, Pittsburgh; Gregory E. Mazza, Bethel Park; Leonard R. Golick, Levelgreen; Paul Pomaibo, North Huntingdon, all of Pa.

[73] Assignee: Westinghouse Electric Corp., Pittsburgh, Pa.

[21] Appl. No.: 827,116

[22] Filed: Feb. 7, 1986

[51] Int. Cl.[4] .............................................. G21C 19/00
[52] U.S. Cl. ................................. 376/260; 294/119.1; 414/146
[58] Field of Search ............... 376/260, 284, 261, 463, 376/271; 294/116, 115, 119.1, 2, 86.4, 906; 414/731, 146, 786

[56] References Cited

U.S. PATENT DOCUMENTS

| | | | |
|---|---|---|---|
| 2,642,307 | 6/1953 | Olson | 294/67.33 |
| 2,983,662 | 5/1961 | Shillitto et al. | 376/433 |
| 3,033,605 | 5/1962 | Morrow, Jr. | 294/115 |
| 3,691,011 | 9/1972 | Kruger et al. | 376/271 |
| 3,768,668 | 10/1973 | Schukei | 376/271 |
| 3,823,065 | 7/1974 | Jones | 376/271 |
| 3,978,957 | 9/1976 | Hoffmeister | 376/264 |
| 4,279,699 | 7/1981 | Kuhn | 376/268 |

Primary Examiner—Deborah L. Kyle
Assistant Examiner—Daniel Wasil
Attorney, Agent, or Firm—Daniel C. Abebes

[57] ABSTRACT

A handling tool for selectively removable cruciforms employed in ice baskets of the type employed with nuclear power generator systems. The tool includes clamping means for engaging a compressible central portion of the removable cruciform to retract same inwardly and permit moving same, in a horizontal orientation, throughout the axial height of the interior of the ice basket. When at a desired elevation, selective actuating means moves previously retracted guide means to an extended or projected position for engaging a retaining ring of the ice basket and supporting the tool on the ring. The clamping means is selectively actuated to the disengaged position for releasing the cruciform whereupon the same expands, projecting legs associated therewith radially outwardly and engaging the retaining ring, to support the cruciform on the ring. The tool may thereafter be removed. For removing a cruciform, the tool is lowered and the clamping means actuated to engage and compress the central portion thereof for releasing these from the ring and, in that condition, is raised for removing the cruciform from the ice basket.

8 Claims, 12 Drawing Figures

HANDLING TOOL FOR, AND METHOD OF USE OF, ICE BASKET REMOVABLE CRUCIFORM

BACKGROUND OF THE INVENTION

1. Field of the Invention

This invention relates to ice condenser containments, also known as ice baskets, employed for condensing steam generated from the primary water of a nuclear reactor in the event of an accidental loss of coolant and, more particularly, to a handling tool for, and method of, selectively installing and removing removable cruciforms which may be employed as a replacement for the original, nonreplaceable cruciforms of conventional ice baskets, or as an original assembly component of an improved ice basket.

2. State of the Relevant Art

Ice condenser containments, also known as ice baskets, are employed with nuclear reactors for condensing the steam from the primary water of the reactor in the event of an accidental loss of coolant. In a typical installation, there are provided approximately 2,000 ice baskets, each of which is approximately one foot in diameter and 48 feet in height and is filled with approximately 1,500 pounds of ice. The sidewalls of the ice basket, substantially cylindrical in configuration, are perforated to permit rapid exposure of the steam to the ice and corresponding, rapid cooling.

Each such ice basket incorporates, at spaced intervals therein, stiffening rings comprising structural elements which provide lateral rigidity and support, to accommodate not only the weight of ice contained therein but also seismic and other disturbances. Conventional ice baskets furthermore include elements known as cruciforms, comprising generally x-shaped metal straps which extend diametrically across the interior of the basket and are welded at the ends of the straps to the interior sidewalls of the basket, typically at or adjacent the stiffening rings. Typically, the cruciforms are formed of $\frac{1}{8}$ inch thick metal, and are 1 $\frac{1}{2}$ inches in height. Further, typically, seven (7) such cruciforms are assembled within the basket, spaced at approximately six (6) foot vertical intervals. While not structural members of the baskets and thus not necessary to add radial stiffness to the ice basket cross-section, the cruciforms are necessary elements for satisfying various requirements of the ice bed within the basket. For example, cruciforms are necessary to assure that the geometry of the ice bed within the basket is contained during the entire meltout period of a postulated loss of coolant accident. Specifically, as the ice melts upwardly and away from the bottom of the ice baskets, ice contained therein at higher elevations cannot be permitted to fall down into the bottoms of the baskets, since this presents the potential of creating bypass flow routes for the emerging steam which would accompany the loss of coolant. The cruciforms also serve to prevent large masses of ice from falling during seismic disturbances; falling masses of ice could impose unacceptable impact loads on the ice basket and related, underlying supporting structure.

The presence of the cruciforms, however, compounds a maintenance problem which exists in the operation of nuclear power systems employing such ice condenser containments. Particularly, due to sublimation of the ice, the initial volume and weight thereof decreases with time and thus the ice must be replenished, or replaced. A minimum required amount of ice is typically at least 1,200 pounds for each ice basket, for assuring its effectiveness for counteracting the accidental loss of coolant, as above referenced. The cruciforms impose a substantial obstacle to replenishing the supply of ice, as the latter is depleted due to sublimation. For example, the successively lower compartments of the basket, as delineated by the cruciforms, may contain inadequate charges of ice due to sublimation loss, which changes remain spaced apart due to the presence of cruciforms. Thus, while access may be had to the upper, open end of the ice basket for recharging the first and possibly the second upper compartments, the lower compartments are inaccessible, yet may contain an inadequate charge of ice. The ice basket thus loses its required cooling capability, presenting a potentially serious deficiency.

Various solutions have been proposed heretofore to overcome the problems thus presented in the replenishment of the ice in view of the obstacles presented by the cruciforms. One such solution is the removal of the original cruciforms, as permitted in view of their not comprising a structural support element of the basket. A known, replaceable cruciform design exists which has been proposed for installation in place of the previously permanent, but removed, original cruciforms. The replaceable cruciform of known design requires that it be rotated onto its side, effectively reducing its width such that it can be passed downwardly through the ice basket; at the desired elevation for installation, the cruciform then must be rotated back to a horizontal position. Individual, spring-activated locking devices then are released by remote actuation from the top open end of the ice basket, by tools which afford the requisite reaching length into the ice basket, so as to lock the cruciform onto the coupling or stiffening ring within the basket at the corresponding elevation. The known, replaceable cruciform, however, is extremely difficult to install and remove, and is virtually impossible to install at elevations within the ice basket lower than approximately 24 feet from the open top thereof.

Accordingly, there exists a need for a removable cruciform which is readily installed or removed, at every required elevation within the ice basket, and, additionally, for a handling tool which is employable in combination with such a removable cruciform, and to a related method of use thereof, to achieve the convenient and efficient installation and/or removal such a removable cruciform at every required elevation within the ice basket.

SUMMARY OF THE INVENTION

The present invention provides a handling tool and a related method of operation, for selectively installing and/or removing a removable cruciform of an improved type, comprising the subject matter of the concurrently filed patent application entitled "REMOVABLE CRUCIFORM FOR ICE CONDENSER ICE BASKET" of the common coinventors hereof, and assigned to the common assionee hereof. The removable cruciform of the related application is spring acuated and may be compressed relatively to its normal outer perimeter boundaries, whereby it may be moved, while in a horizontal orientation, axially into or out of an ice basket, and, further, may be released to engage a stiffening ring in the ice basket at a desired elevation, thereby to be temporarily, but securely, structurally locked in position. Alternatively, the cruciforms of the related invention may be compressed and removed from their installed positions within an ice basket, thereby to afford unimpeded access to the corresponding compartments defined thereby throughout the entire height of the ice basket, for maintenance and related purposes. Thus, the configuration of the cruciform of the related invention is especially well adapted for compression and movement through an ice basket, and for expansion into an installed position to afford the required support functions. However, the substantial height and limited accessibility within the ice baskets, particularly at the sucessively lower elevations at which cruciforms must be installed and/or removed, present substantial obstacles to accomplishing those functions.

The handling tool and method of the present invention, while of general applicability for use with compressible cruciforms, are particularly advantageous for selective insertion or removal of the cruciform of the related invention as hereinabove set forth. More particularly, the handling tool of the present invention is of generally elongated configuration, so as to facilitate its movement in an axial direction throughout the elevation of an ice basket, and for that purpose includes a main frame having a harness by which the tool is supported from a derrick which lowers the tool into or raises the tool from within an ice basket. A pair of parallel support plates extend in an axial direction downwardly from the frame and carry a mounting bar at the lower ends thereof. A pair of clamping shoes pivotally mounted to the support plate at the lower ends thereof and extending below the mounting bar are selectively actuated between engaged and disengaged positions by an air cylinder mounted on the frame. The tool is lowered to dispose the clamping shoes about the spring housing of the referenced, removable cruciform, with the direction of movement of the clamping shoes between the engaged and disengaged positions aligned with the axis of compression/expansion of the cruciform. The associated air cylinder for the clamping shoes then is actuated, thereby to pivot the shoes toward their engaged position and clamp the housing therebetween, compressing same and thereby retracting the radially extending legs of the removable cruciform. A guide assembly conveniently is incorporated into the noted mounting bar, and includes a pair of guide fingers respectively disposed at the opposite ends of the bar, the fingers having outer configurations defining arcuate segments of a radius corresponding to the interior radius of the ice basket interior wall such that the guide fingers may be received over and supported on a corresponding retaining ring. The guide fingers have horizontally extending shanks received in corresponding slide channels within the mounting bar and angle-mounted actuating lever arms which are driven in vertical reciprocation by corresponding air cylinders mounted to the depending side support plate so as to function in a cam follower manner to project the guide fingers to an outer, retaining ring engaging position, and to retract the guide fingers, through the shanks thereof, to withdraw same from the retaining ring and thus enable movement of the tool axially through the ice basket.

In operation, to install a removable cruciform, the tool is positioned over a removable cruciform with the clamping shoes thereof in a disengaged position and aligned in the direction of motion thereof with the axis of compression/expansion of the spring housing. The corresponding air cylinder then is actuated and the clamping shoes moved to the engaged position to compress the spring housing, and thereby to retract the radially extending legs of the cruciform. The tool, with the guide fingers as well retracted, then is inserted into the ice basket and lowered to a position just above the required elevation. Just prior to being lowered into precise alignment at that elevation, the guide assembly is actuated to project the guide fingers outwardly, whereupon further, slight lowering of the tool engages the guide fingers over the corresponding retaining ring. The clamping assembly then is deactuated, to thereby release the spring housing and permit the same to expand, projecting the legs and the corresponding extensions outwardly so as to receive the retaining ring in the corresponding channels thereof and thereby lock the releasable cruciform in position. The guide fingers then are retracted and the tool axially withdrawn from within the ice basket.

For removing a cruciform from within the ice basket, the tool is inserted with the guide fingers retracted and the shoes disengaged, so as to position the clamping shoes about the spring housing in alignment with the axis of compression/expansion thereof. When so aligned in position, the clamping shoes are actuated to engage and compress the spring housing, releasing the removable cruciform from the corresponding retaining ring, and then the tool, with the engaged, removable cruciform, is axially, vertically withdrawn from within the ice basket.

Accordingly, the tool of the invention, and the method of the operation which it affords, will be seen to function in an efficient and reliable manner, minimizing the required operating time for removing and/or installing removable cruciforms, despite the inherent inaccessibility thereof in view of the height of the typical ice baskets and the required positioning of the cruciforms therein, to enable them to perform their intended functions.

The foregoing and other advantages of the removable cruciform handling tool of the present invention will be more apparent from the following drawings and detailed description in relation thereto.

DETAILED DESCRIPTION OF THE PREFERRED EMBODIMENT

Before describing the handling tool of the present invention, it is believed informative, first, to discuss the structure of an ice basket and the use therein of removable cruciforms, in accordance with above-noted related invention, and with which removable cruciforms the handling tool, and the related method of the present invention, are most advantageously employed.

Figure 1:
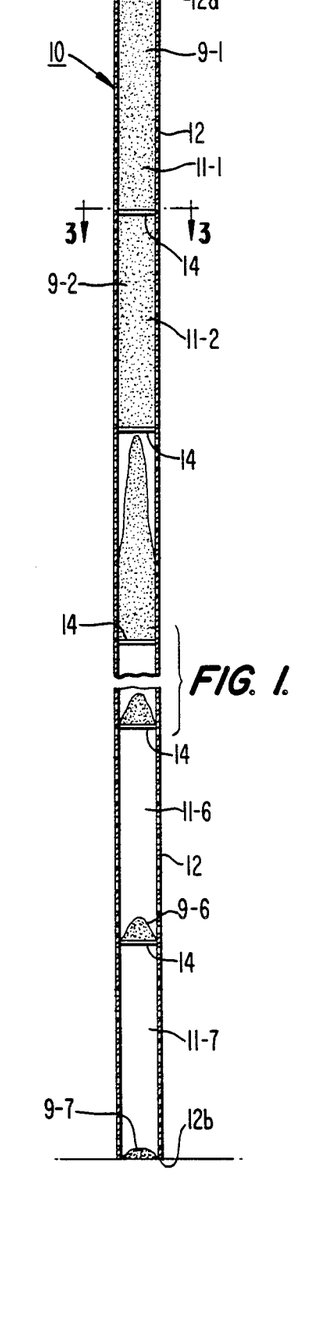
FIG. 1 is an elevational view, in cross-section, of an ice basket having removable cruciforms of the type of the related invention, illustrating the installation thereof as accomplished through use of the handling tool of the present invention, and as well illustrating a sublimated ice condition.

FIG. 1 is an elevational view, in cross-section, of an ice basket 10 having a cylindrical, perforated metal sidewall and divided into a series of compartments, delineated by removable cruciforms 14 in accordance with the related invention. The open, upper end 12a of ice basket 10 affords limited access to the interior of the basket 10, the lower end 12b typically being enclosed by a grating or meshlike end closure (not shown) which is contiguous with support structure (not shown) for the basket 10. In a typical installation, the removable cruciforms 14 of the related invention are disposed at axially displaced positions, or elevations, within the basket 10, corresponding to those of original, welded-in-place cruciforms, and thus are disposed at approximately 6 foot intervals, defining a succession of seven compartments 11-1 through 11-7 delineated by the plurality of cruciforms 14 within the basket 10, each containing initially a full charge of ice.

As described in further detail hereinafter, each of the cruciforms 14 is releasably engaged on a stiffening ring (not seen in FIG. 1) for retaining same in position at the desired elevation within the ice basket 10. The cruciforms 14 are seen to perform the intended function of supporting the charges of ice within the corresponding compartments, despite the fact that sublimation has resulted in reduced charges of ice existing within the lower compartments. For example, whereas the charges of ice 9-1 and 9-2 substantially fill the corresponding compartments 11-1 and 11-2, in the lowermost compartments 11-6 and 11-7, significantly depleted charges of ice 9-6 and 9-7, respectively, remain. Whereas removal of the charge of ice at the uppermost compartment 11-1 is feasible with conventional tools since accessible through the open upper end 12a, removal of ice from the successively lower compartments is a difficult task. A preferred instrument which enables efficient and effective removal of ice from each of the successive compartments throughout the entire height of the basket 10 is disclosed in the copending application entitled "Ice Remover Auger for Ice Condention Containment", the inventors of which are coinventors herein, the application furthermore being assigned to the common assignee hereof.

It thus will be understood that as the ice in each successive, lower compartment is removed, access may be gained to the corresponding removable cruciform 14 of the related invention, and the same may be retracted and withdrawn, compartment by compartment, thereby to gain access to the lowermost compartment 11-7. The ice basket 10 may then be recharged with ice and the cruciforms 14 reinstalled, in compartment by compartment order. The cruciforms 14 of the related invention, however, also accomodate alternative techniques and related equipment for accomplishing these same purposes, as later described herein.

It furthermore should be understood that where possible, removable cruciforms 14 in accordance with the related invention may be employed initially in a new installation, and not merely as a replacement for the conventional welded-in-place cruciforms of prior ice baskets, subsequently to their removal. However, where the removable cruciforms are to be employed in existing ice baskets as a replacement for the welded-in-place, conventional cruciforms, the latter must first be removed. Equipment for performing that function is disclosed in the copending application entitled "Ice Basket Cruciform Removal Tool", the inventor of which is a coinventor herein, the application being assigned to the common assignee hereof.

Figure 2:
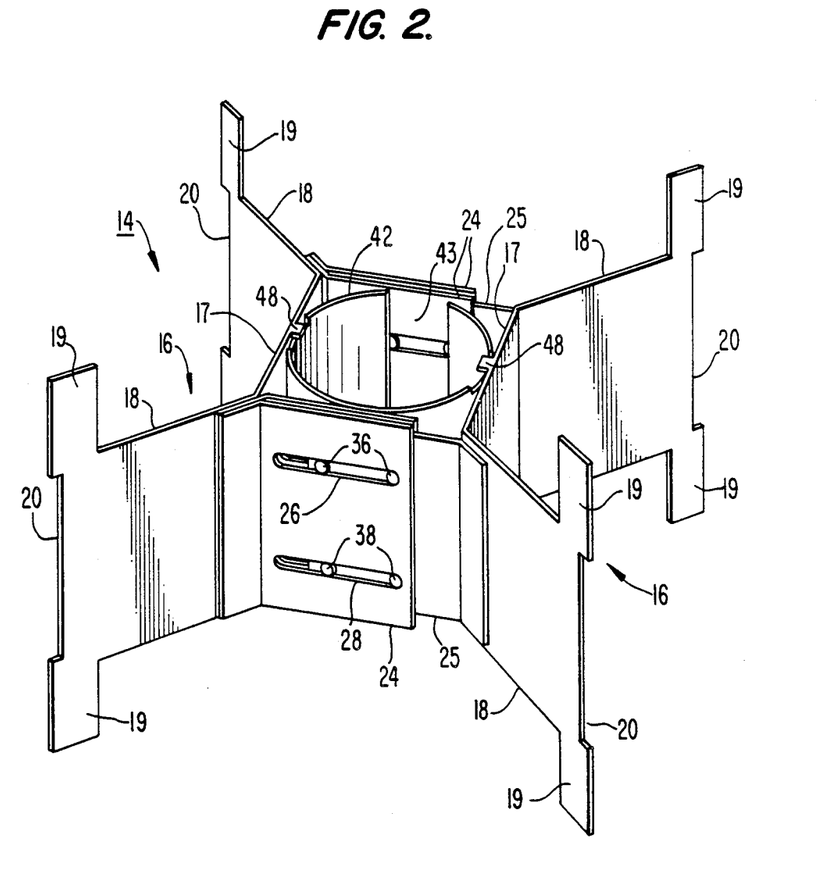
FIG. 2 is an elevational, perspective view of the removable cruciform of the related invention, and of the type with which the handling tool of the present invention is designed for use.
Figure 3:
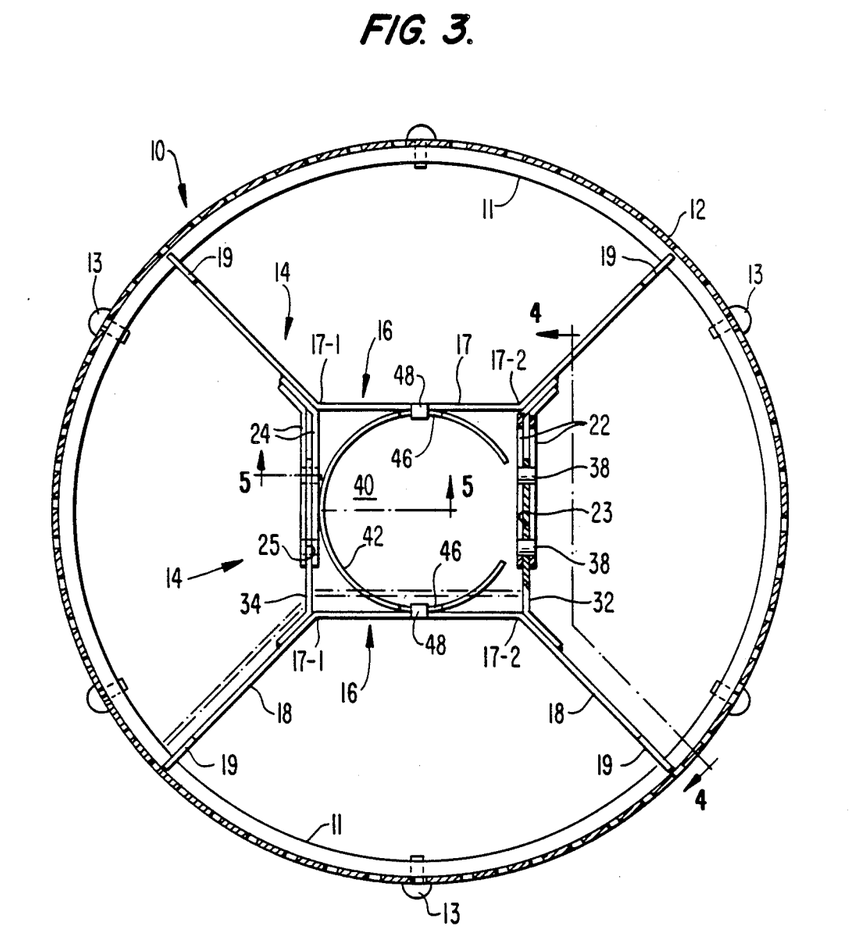
FIG. 3 is a plan view, taken in cross-section along a plane through line 3—3 in FIG. 1, illustrating the cruciform of the related invention as installed within an ice basket, engaging a stiffening ring therein.

The cruciform 14 of the related invention is shown in detail in the perspective, elevational view of FIG. 2 and, as assembled within an ice basket 10, in the plan view of FIG. 3, taken generally along the cross-sectional view line 3—3 in FIG. 1. Further details of the cruciform 14 of the related invention are set forth in the side elevational view of FIG. 4, partly in cross-section and taken generally along the line 4—4 in FIG. 3, but wherein the sidewall 12 of the ice basket has been removed for simplicity and clarity of illustration. Additionally, the elevational view of FIG. 5 comprising a partial cross-section, taken along line 5—5 in FIG. 3, illustrates details of the internal construction of the cruciform 14.

Figure 4:
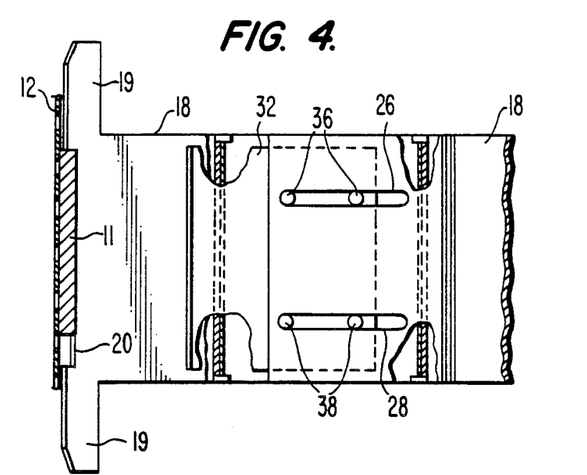
FIG. 4 is a side elevational view of a portion of the removable cruciform of the related invention, as engaged on a stiffening ring, taken along line 4—4 in FIG. 3, with the cylindrical sidewall structure of the ice basket removed for ease and clarity of illustration.

With concurrent reference to FIGS. 2, 3 and 4, the removable cruciform 14 in accordance with the related invention comprises a pair of brackets 16, each of a generally V-shaped, truncated base configuration. Each bracket 16 comprises a central, base portion 17 having parallel longitudinal edges 17-1 and 17-2 from which corresponding integral legs 18 extend at a predetermined angle, so as to assume generally radial orientations relative to the sidewall 12 of an ice basket 10 in which the cruciform 14 is installed, as best seen in FIG. 3. Each of the legs 18 carries a pair of integral, upper and lower feet 19 which extend radially beyond the outer longitudinal edge of the corresponding leg 18 and define a receiving channel 20 therebetween. A pair of support plate assemblies 22 and 24, respectively comprising parallel, soaced plates 22a, 22b, and 24a, 24b, defining corresponding slide channels 23 and 25 therebetween, are secured to and extend in parallel relationship from one of the brackets 16, at right angles to the central portion 17 thereof. As best seen in FIG. 4, a pair of parallel, horizontal slots 26 and 28 are formed so as to extend, in alignment, through each of the parallel support plates 22a, 22b and 24a, 24b.

On the other of the brackets 16 there are secured a pair of slide support plates 32 and 34, affixed thereto so as to extend at right angles from the central portion 17 in parallel relationship, and spaced apart so as to be received in telescoping, sliding relationship in the corresponding slide channels 23 and 25 of the support plate assemblies 22 and 24. Each of the slide suoport plates 32 and 34 has secured thereto corresponding pin pairs 36 and 38 at positions aligned with, and for being received through, the respective slots 26 and 28 in the mating support plate assemblies 22 and 24, to restrict, or limit, the telescoping, sliding relationship to a direction parallel to the slots 26 and 28, and a length of travel as defined by the abutment of the pin pairs 36 and 38 with the corresponding, opposite ends of the slots 26 and 28. As can be best appreciated from FIG. 3, the pair of brackets 16 accordingly may be compressed and/or expanded within a limited length of travel along a diameter of the ice basket 10 passing perpendicularly through the respective central portions 17 thereof, and corresponding to a symmetrically disposed, compression/expansion axis of the cruciform 14.

As best seen in FIG. 4 the slide support plates 32 and 34 are slighty shorter in axial height (i.e., along the vertical axis of the cruciform 14, corresponding to the vertical axis of the cylindrical basket 10) than the corresponding support plates 22a, 22b and 24a, 24b. For example, support plates 22a, 22b and 24a, 24b, may each be approximately 4 inches in axial height whereas the slide support plates 32 and 34 may be of approximately 3.62 inches in axial height. The V-shaped brackets 16 as well may be of approximately 4 inches in axial height.

The central portions 17 of the respective brackets 16 and the telescopingly engaged support plate assemblies and slide support plates 22, 32, and 24, 34, define therewithin a spring housing 40 which is of nominally square cross-section but, as described, may be compressed or expanded within a limited extent of travel along an axis perpendicular to the parallel, central portions 17. A C-shaped spring 42 is received in the housing 40. With concurrent reference to FIGS. 3 to 7, the spring 42 defines a longitudinal, or axially extending opening 43 between its free ends 42a and 42b; while illustrated in FIG. 7 as of circular cross-sectional configuration, corresponding to its installed condition in FIG. 3, the spring 42 in a free configuration (i.e., when not disposed within the housing 40) assumes a normal, expanded configuration. Accordingly, the spring 42 engages the base portions of the brackets 16 and applies a resilient biasing force thereto for maintaining the spaced relationship thereof and the nominally square cross-sectional configuration of the housing 40, the pins 36 and 38 abutting the ends of the slots 26 and 28.

Figure 5:
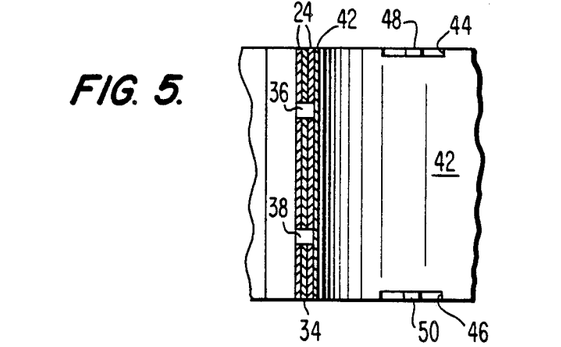
FIG. 5 is an elevational and partial cross-sectional view, taken along line 5—5 in FIG. 3.
Figure 6:
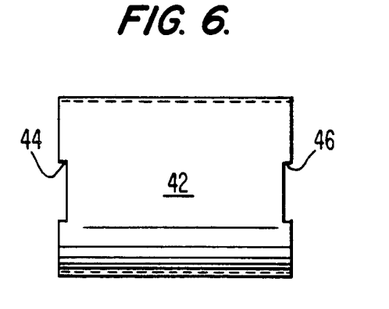
FIGS. 6 and 7 are side elevational and plan views, respectively, of the C-shaped compressible spring employed in the removable cruciform of the related invention.
Figure 7:
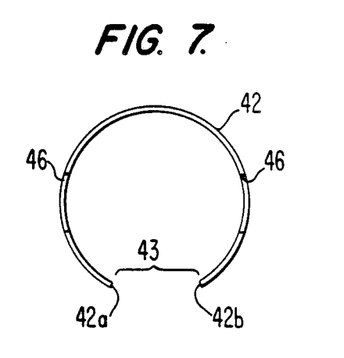

Pairs of notches 44 and 46 are formed in the spring 42 at its opposite ends, each pair preferably being symmetrically disposed about a diameter which, as seen in FIG. 7, extends transversely to a diameter passing symmetrically through the opening 43. Pairs of tabs 48 and 50, as seen in FIGS. 3 and 5, are formed on the upper and lower edges of the central portions 17 of both brackets 16 and extend laterally and thus radially inwardly, so as to be received in the corresponding, aligned notches 44 and 46 of the spring 42.

The cylindrical sidewall 12 of the ice basket 10 has rigidly secured therein, at spaced elevations, a plurality of stiffening rings 11. A single such stiffening ring 11 is illustrated in FIGS. 3 and 4, which may be welded in place and/or secured to the sidewall 12 by screws 13.

In use of the replaceable cruciform 14 of the related invention, the brackets 16 are moved together by compressing the spring 42, as before described, thus effectively retracting the radially extending legs 18. In a specific embodiment of the cruciform, the retraction or compression reduces the effective diameter of the circumferential periphery of the legs and associated feet extensions from 11.90′ (as installed and engaged within the basket 10) to 11.50′. This permits lowering the cruciform 14, in a horizontal orientation, axially downwardly through the ice basket 10 to a desired elevation in alignment with a stiffening ring 11. The cruciform 14 then is released from compression while supported at the desired elevation, the C-spring 42 causing the cruciform 14 to expand, advancing the legs 18 toward the sidewall 12 of the ice basket 10 so as to receive the stiffening ring 11 in the channels 20 intermediate the feet 19 of each leg 18.

The removable cruciform 14 of the related invention thus satisfies the requirement of being readily manipulated, both for installation into and removal from required elevations within an ice basket, for the purposes hereinbefore set forth. The configuration of the cruciform 14, moreover, is particularly advantageous, taking into account the maintenance functions required to be performed with respect to ice baskets of the type herein considered. Particularly, the cruciform 14 affords equivalent ice charge support functions, as those of the fixed, or welded-in-place, cruciforms of the prior art and, in fact, improves the supoort function in view of the generally square configuration of the spring housing 40, as compared to the relatively more simple, X-shaped configuration of the metal straps of the prior art cruciforms. Significantly, moreover, the mating configuration of the C-shape spring 42, as disposed within the housing 40, affords a central, axially aligned passage throughout the height of a given ice basket 10. Specifically, the spring 42, of approximately 3 inches in diameter for the embodiment as illustrated, when used with an ice basket of approximately one (1) foot diameter, affords a convenient central passageway or column, passing through the geometric center of the ice basket 10 throughout its height, to permit thermal drilling operations to provide an axially extending central hole throughout the height of the ice basket through which maintenance tools may be inserted to remove and settle ice. When in use with such apparatus, the subject cruciforms may be retained in position while ice settling operations are performed.

Figure 11:
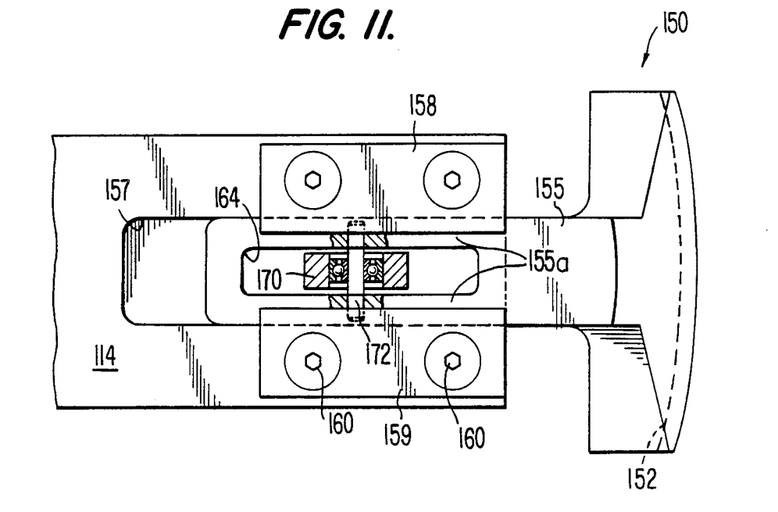
FIG. 11 is an enlarged view of a guide assembly including radially movable guide fingers, taken along line 11—11 in FIG. 9.
Figure 12:
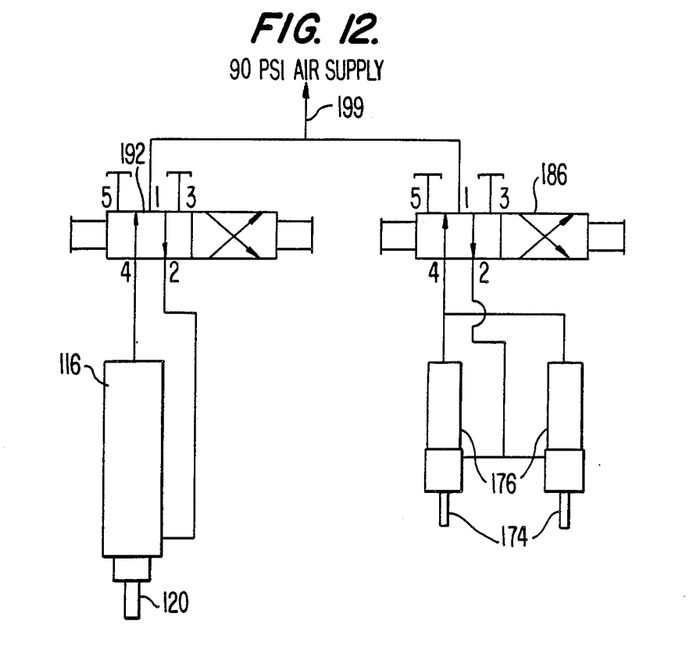
FIG. 12 is an air system schematic for operating various air cylinders through associated valves, as incorporated in the handling tool of the invention.

The handling tool of the present invention and the associated method of operation thereof in conjunction with the selective installation and removal of cruciforms of the related invention as hereinabove described, will now be discussed with reference to FIGS. 8 throuoh 12, in which FIGS. 8 and 9 comprise front and side elevational views, respectively, of the tool, each thereof being partially in cross-section and partially broken away for ease and clarity of illustration. FIG. 10 is a top plan view of the tool, taken along line 10—10 in FIG. 8. FIG. 11 is a plan view, taken along line 11—11 in FIG. 9, of a guide assembly and movable guide fingers. FIG. 12 is an air system schematic illustrating associated valves and air cylinders incorporated in the handling tool, for explaining the operation thereof.

Figure 8:
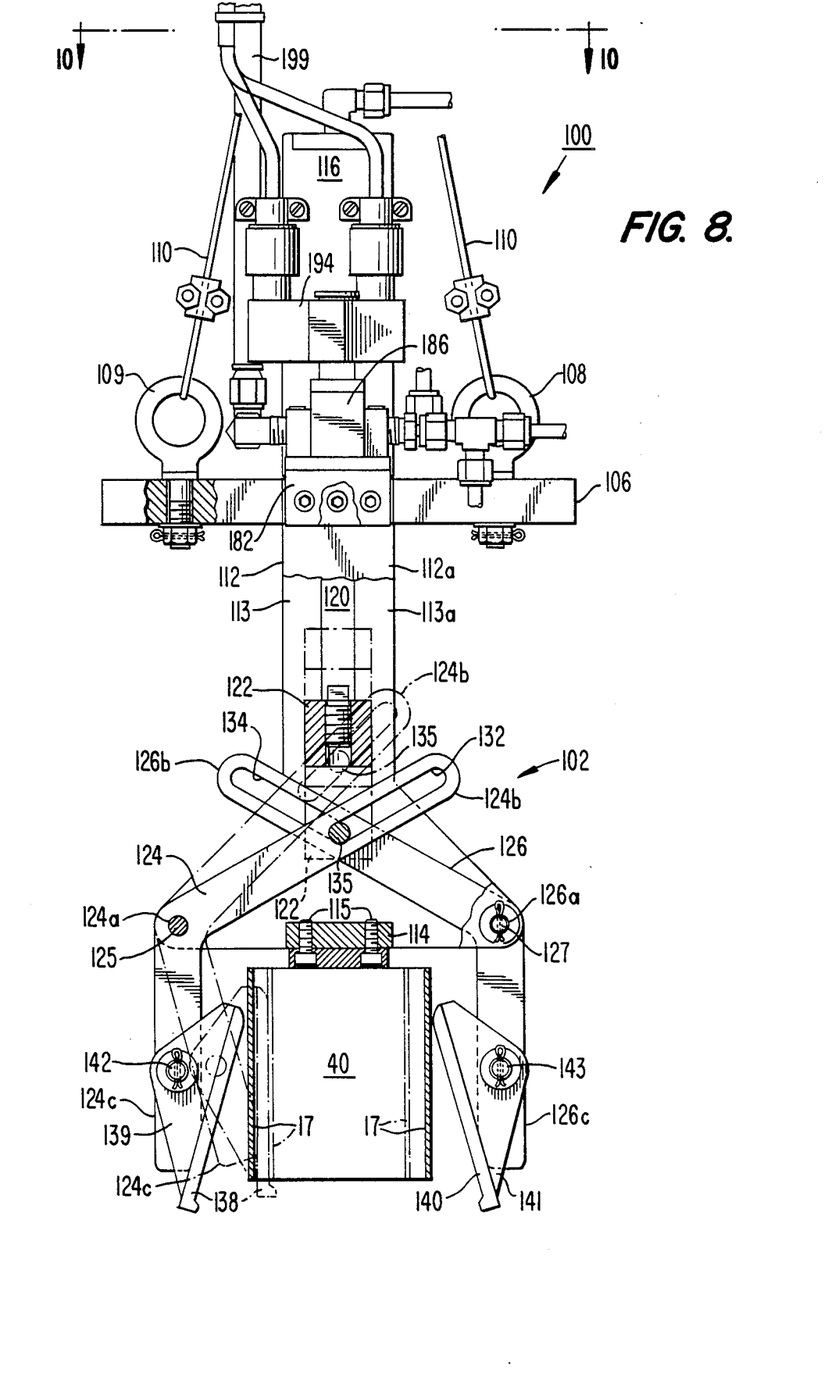
FIG. 8 is a front elevational view, partially in cross-section and partially broken away, of the handling tool of the present invention.
Figure 9:
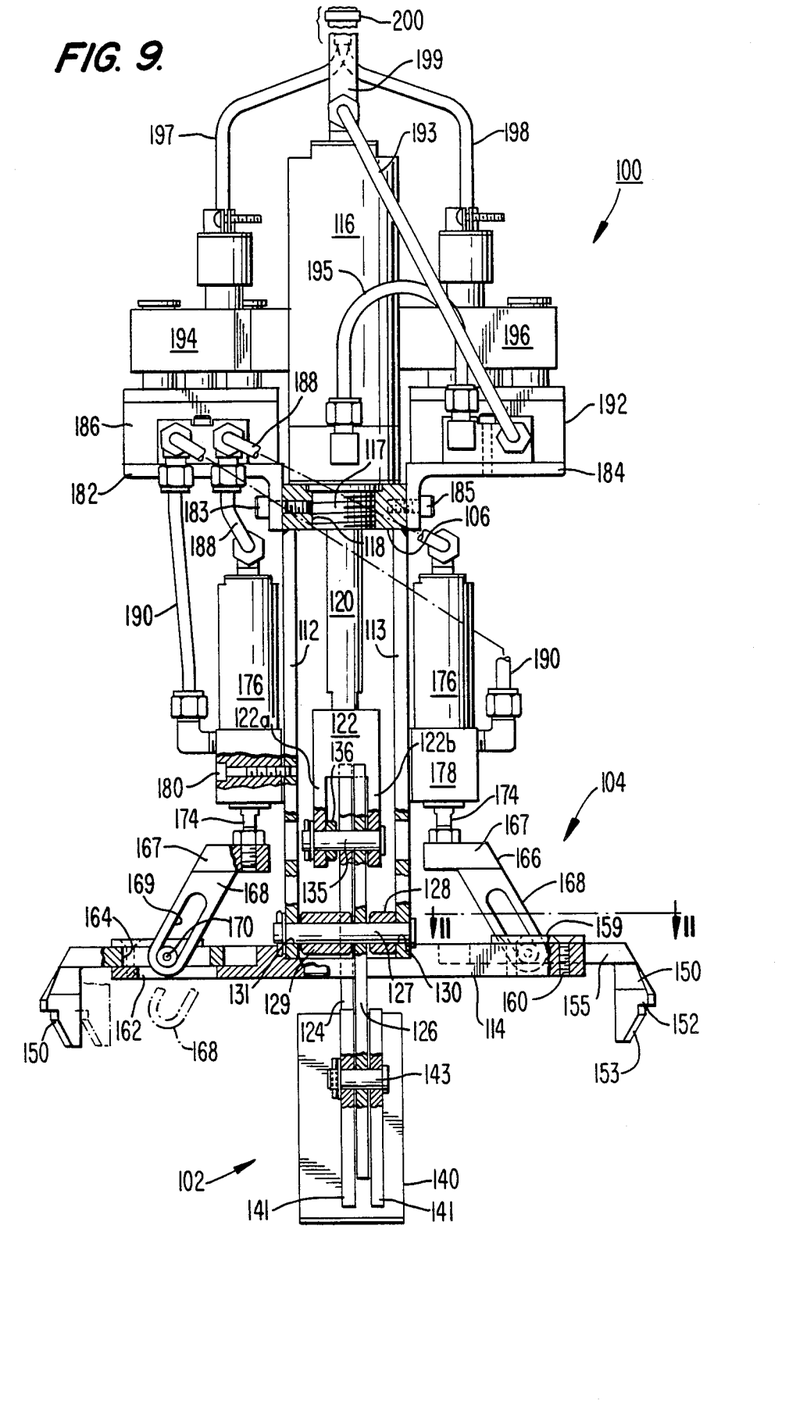
FIG. 9 is a side elevational view, thus oriented 90° relatively to FIG. 8, and likewise partially in cross-section and partially broken away, of the handling tool of the invention.
Figure 10:
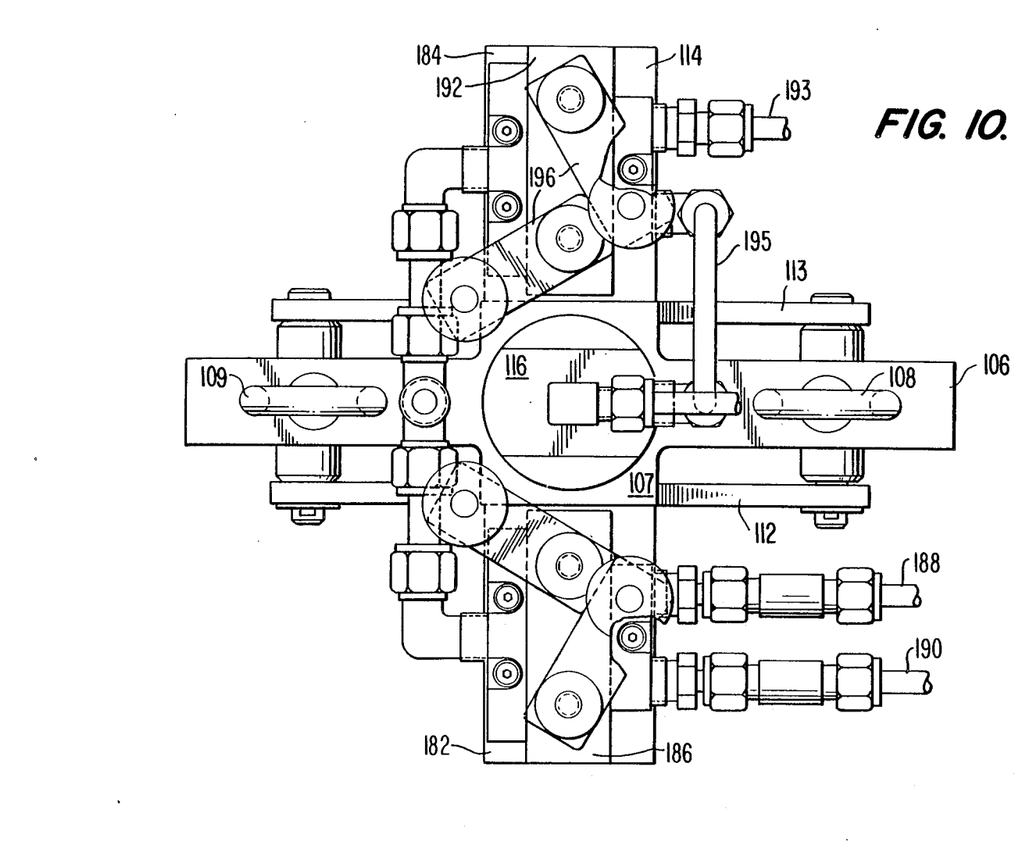
FIG. 10 is a top plan view of the handling tool of the invention, taken alono line 10—10 in FIG. 8.

With concurrent reference to FIGS. 8 through 10, the handling tool 100 comprises, as major components, a clamping assembly 102, best seen in FIG. 8, and a guide assembly 104, best seen in FIG. 9, portions of the guide assembly 104 being removed from the view of FIG. 8 for clarity and ease of illustration. A frame 106 of elongated generally rectangular configuration but including a transversely enlarged central portion 107, comprises the main support element for the tool 100. Eyebolts 108 and 109 are connected thereto at its opposite extremities for receiving a sling 110 by which the tool 100 is supported from a suitable derrick or other device, so as to be lowered into an ice basket 10 from the open, upper end 12a thereof (see FIG. 1). A pair of support plates 112 and 113 of generally an inverted "Y"-shaped outer peripheral configuration are secured at the narrow, upper ends thereof to the frame 106 and extend vertically downwardly therefrom in parallel, spaced relationship. A mounting bar 114 of generally rectangular configuration is configured to receive the lower ends 112b and 113b of the support plates 112 and 113 and is secured thereto by bolts 115 (see FIG. 8).

An air cylinder 116 is mounted to the frame 106 by a threaded shaft 117 at the lower end thereof which is received in a corresponding threaded bore 118 centrally disposed in the transversely enlarged central portion 107 of the frame 106. The piston rod, or shaft, 120 of the air cylinder 116 extends downwardly, in generally parallel relationship with the support plates 112 and 113, and carries a clevis 122 at its lower end.

A pair of L-shaped arms 124 and 126 are pivotally mounted at their respective corner portions 124a and 126a to the support plates 112 and 113 by corresponding pivot pins 125 and 127 (FIG. 8). As illustrated in partial cross-section in the view of FIG. 9, suitable spacers 128 and 129 are received on the pivot pin 127 to maintain the lever arm 126 properly spaced between support plates 112 and 113, the pivot pin 127 being received through suitable apertures 130 and 131 in the corresponding, lower corner extremities of the parallel supoort plates 112 and 113. It will be understood that arm 124 is similarly supported on the pivot pin 125 at the opposite, lower corner extremities of the support plates 112 and 113.

The upper arm portions 124b and 126b of the lever arms 124 and 126 have elongated slots 132 and 134 through which is received a common drive pin 135 (FIG. 8), the opposite ends of which are received through corresponding apertures provided therefor in the parallel, depending legs 122a and 122b of the clevis 122 and suitably secured thereto. Spacers 136 on the drive pin 135 maintain the parallel alignment of the lever arms 124 and 126 (see FIG. 9). A pair of clamping shoes 138 and 140 are pivotally mounting to the lower portions 124c and 126c of the lever arms 124 and 126. The pivotal mounting is afforded by transversely extending, parallel angle bracket pairs 139 and 141 extending transversely from the rear, or outer surfaces of the respective shoes 138 and 140 and corresponding pivot pins 142 and 143 which are received through suitable, aligned apertures in the respective bracket pairs 139 and 141 and in the corresponding, lower portions 124c and 126c of the arms 124 and 126, respectively.

The clamping shoes 138 and 140 are shown in solid line in FIG. 8 in the disengaged, or released state as produced by the complementary pivotal movement of the corresponding lever arms 124 and 126 to the rest, or solid line positions shown in FIG. 8, producing relative, outward displacement of the corresponding lower lever arms 124c and 126c. The pivotal actuation of the lever arms 124 and 126 is produced by selective energization of the air cylinder 116 for driving the corresponding piston rod 120 thereof to the extended, axially downward position, at which position the common drive pin 135 is shown in solid lines (in cross-section) in FIG. 8. Conversely, by selective actuation of air cylinder 116 to withdraw or retract the piston rod 120 and thus move same in a vertically upward direction so as to translate the common drive pin 135 from the solid line to the dotted line position indicated in FIG. 8, the lever arms 124 and 126 are pivoted in complementary, opposite directions so as to rotate the respective upper arm portions 124b and 126b in an upward direction (as illustrated in dotted line for the upper arm portion 124b of the lever arm 124 in FIG. 8) and correspondingly to inwardly displace the lower lever arm portions 124c, 126c and thereby to move the corresponding lamping shoes 138, 140 into an engaged, or clamping state (as shown by dotted lines in FIG. 8 for the lower arm portion 124c and the clamping shoe 138). As explained in more detail hereafter, the selective, engaging or clamping state, and the disengaged or releasing state of the shoes 138 and 140 are employed in conjunction with a removable cruciform 14 as before described. Particularly, the spring housing 40 of such a cruciform is shown in cross-section in FIG. 8 at a rest or fully expanded condition, disposed between the shoes 138 and 140 in their disengaged or released state, all as illustrated in solid lines in FIG. 8. Actuation of the shoes 138 and 140 to the engaged or clamping state causes the shoes 138 and 140 to engage the base portions 17 of the corresponding brackets 16 of the cruciform 14 and move same together to the dotted line positions indicated in FIG. 8, compressing the spring (not shown in FIG. 8) within the housing 40.

The guide assembly 104 comprises a pair of guide fingers 150 which, as seen from FIG. 11, have an outer, arcuate periphery and, as best seen in FIG. 9, an undercut segment 152 and an inwardly tapered surface 153 which function together to facilitate centering of the guide fingers 150 relative to a stiffening ring 11 and engaging same thereby, as shown in FIGS. 3 and 4. Inasmuch as each of the supporting and actuating structures for both guide fingers 150 are the same, reference will be had concurrently to both thereof; with reference to FIG. 9, the supporting structure for the left-hand guide finger 150 is shown in cross-section whereas the supporting structure for the right-hand guide finger 150 is shown only partially in cross-section and remaining portions in phantom lines, to facilitate the following description thereof.

Each guide finger 150 includes an integral shank 155 which is received in an elongated recess 157 in the upper surface of the mounting bar 114 and secured therein for telescoping, reciprocal sliding movement by a pair of plates 158 and 159 which are bolted by bolts 160 to the mounting bar 114. As better seen for the left-hand guide finger 150 in FIG. 9, an open, elongated slot 162 is formed in the central portion of, and in alignment with, the recess 157 in the mounting bar 114. A corresponding, open elongated slot 164 is formed in the integral shank 155 of the guide finger 150 in aligned relationship with slot 162. A lever arm 166 comprises an upper, horizontal arm segment 167 and an angularly, downwardly depending arm segment 168 which is received throuoh the longitudinally aligned slots 162 and 164. The aim segment 168 further includes a correspondingly, angularly oriented, elongated slot 169 within which is receiving a ballbearing 170, the latter housing a pin 172 which is engaged at its opposite ends (see FIG. 11) in the parallel sidewall portions 155a bounding the open elongated slot 164 in the shank 155, at generally centrally disposed positions relative to the elongated dimension of the slot 164. Each lever arm 166 is secured at its upper horizontal arm seoment to a piston rod 174 of an air cylinder 176, the latter secured by a suitable mounting blocks 178 and bolts 180 to the respectively corresponding support plates 112 and 113.

As is believed apparent, suitable, selective actuation of the pair of air cylinders 176 will selectively drive the lever arms 166 in corresponding, vertically reciprocating opposite directions and, due to the angular inclination of the legs 168, cause the guide fingers 150 to move in complementary outward, or inward directions. As shown by the phantom line representation of the lower portion of the arm segment 168 of the left-hand guide finger 150 in FIG. 9, the aligned slots 162 and 164 permit the downward movement therethrough of the angularly depending arm segment 168, so as to withdraw, or retract, the corresponding drive finger 150 to the dotted, or phantom line position indicated.

The air cylinders 116 and 176, and the associated actuating or driving means therefor, are conventional and thus the same are illustrated in simplified fashion in FIGS. 9 and 10. Very briefly, a pair of brackets 182 and 184 are secured, as illustrated by bolts 183 and 185, to the frame 106. A first solenoid operated valve 186 having dual outputs is connected on the bracket 182 for operating the pair of air cylinders 176 associated with the clamping assembly 102. As indicated, in part schematically, conduits or pressure hoses 188 connect the dual outputs of the valve 186 to the corresponding inputs of the dual air cylinders 176 to produce a downward stroke of the corresponding piston rods 174 thereof, and, as similarly indicated, a pair of pressure hoses 190 is connected to the respective pair of air cylinders 176 for effecting the reverse actuation of the air cylinder 176, to withdraw or retract the piston rods 174 thereof. A further solenoid operated valve 192 mounted on bracket 184 includes corresponding conduits 193 and 195 for similarly actuating air cylinder 116, to extend or retract the associated piston rod 120. Connector blocks 194 and 196 provide for connections between the solenoid operated valves 186 and 192 and electrical wiring assemblies 197 and 198 and a major air pressure conduit 199, for driving the respectively associated air cylinders. For convenience, the major air pressure supply conduit 199 and the wiring assemblies 197 and 198 are secured by a cable tie 200 and linked to the cable or other structure by which the tool 100 is supported through sling 110, to facilitate their being lowered in common with the tool 100 into an ice basket.

FIG. 12 is a simplified air system schematic, indicating the relationship of the major air pressure conduit 199 and its connection to the above-mentioned solenoid operated valves 186 and 192, and the connections of the latter to the respectively associated air cylinder 116 of the clamping assembly 102 and the pair of air cylinders 176 of the guide assembly 104. As is apparent, selective, opposite actuation of the respective valves 186 and 192 produces correspondingly, selective, opposite actuation of the air cylinders 116 and 176.

In operation, the tool 100 of the invention is first connected to suitable supplies of electrical power (e.g., 100 volts) and an air pressure supply (e.g., 90 psi). Toggle switches (not shown) are provided, accessible at all times from the exterior of an ice basket into which the tool 100 is lowered, for selectively energizing solenoid valves 186 and 192 and thereby actuating the associated air cylinders 116 and 176 of the clamping and guide assemblies 102 and 104. Particularly, for inserting a cruciform 14, the guide assembly 104 is actuated for withdrawing or retracting the guide fingers 150 so as to permit lowering tool 100 axially downwardly through the ice basket 10. A removable cruciform 14 is positioned to dispose the spring housing 40, and particularly the base portions 17 of the brackets 16, between the shoes 138 and 140. The clamping assembly 102 then is actuated so as to move the shoes 138 and 140 in a compressing or engaging direction, thereby compressing the C-spring 42 and causing the base portions 17 of the bracket 16 to move together to the dotted line positions illustrated in FIG. 8.

The tool 100, thus holding a removable cruciform 14 in engaged condition, is lowered to the desired elevation within the ice basket 10 to a position slightly above (e.g., approximately 6 inches) the stiffening ring 11 with respect to which the cruciform 14 is to be installed. The guide assembly 104 then is actuated to extend the guide fingers 150 outwardly and the tool 100 then is further lowered until the guide fingers 150 rest on the ring 11, receiving same in the notch 152. The clamping assembly 102 then is operated to release, or disengage, the shoes 138 and 140 and permit the housing 40 to expand under the resilient force of the C-spring 42 so as to project the legs 18 outwardly and engage the ring 11 within the corresponding channels 20. After proper orientation and engagement of the cruciform 14 onto the ring 11 is verified, the guide assembly 104 is actuated to retract the guide fingers 150 and thereby permit removal of the tool 100 from within the ice basket 10.

The operating procedure for removing a removable cruciform already installed in an ice basket 10 is as follows. First, the guide fingers 150 are retracted and the shoes 138 and 140 are actuated to the disengaged position. The tool 100 then is lowered within the basket 10 so as to be disposed in a position substantially as shown in FIG. 8, with mounting bar 131 resting on the upoer edges of the walls of the housing 40, and with the shoes 138 and 140 disposed adjacent the parallel base portions 17 of the housing 40. The clamping assembly 102 then is actuated to engage the shoes 138 and 140 with, and correspondingly compress, the housing 40 thereby retracting the legs 18 and releasing the cruciform from the stiffening ring 11, whereupon the tool 100 with the engaged cruciform 14 is removed from the ice basket. The clamping assembly 102 then is actuated to disengage the shoes 138, 140 from the housing 40 of the removed cruciform 14.

In accordance with the foregoing, it will be seen that the handling tool of the present invention affords effective and efficient handling of removable cruciforms having a central compressible spring-loaded portion whereby the same may be compressed, to assume a reduced outer dimensional configuration either for removal from an ice basket, or for travel through the ice basket to a desired retaining ring elevation, and then remotely released to expand, by virtue of internal spring-loading, and automatically engage the retaining ring and be locked in position therewith. It thus will be understood that the handling tool and method of the present invention are not restricted to the specific cruciform configuration of the related invention, but are highly advantageous when used therewith.

Accordingly, numerous modifications and adaptations of the handling tool of the invention will be apparent to those of skill in the art and thus it is intended by the appended claims to cover all such modifications and adaptations which fall within the true spirit and scope of the invention.

We claim as our invention:

1. A handling tool comprising:

an elongated frame defining a generally vertical axis and comprising a generally elongated and horizontally extending bar and a pair of support plates connected thereto and extending downwardly therefrom in parallel relationship to each other and the vertical axis;

guide means connected to said frame and comprising at least first and second guide fingers, extending radially from said frame axis at angularly displaced positions thereabout and selectively movable between retracted and extended positions, and means for selectively actuating said guide fingers between said retracted and extended positions; and clamping means connected to said frame and extending parallel-axially downwardly therefrom and comprising a pair of mounting arms pivotally connected to said parallel support plates for common, complementary, pivotal movement and including respective actuating slots therein, a pair of clamping shoes respectively pivotally connected to said pair of mounting arms, and means for selectively actuating said clamping means comprising an air cylinder secured to said frame and disposed between said parallel, downwardly extending support plates, said air cylinder having a piston rod extending axially downwardly therefrom, a clevis mounted on the free end of the piston rod, and a pin extending through said slots of said mounting arms and said clevis and said air cylinder being selectively actuable to drive said piston rod in corresponding axial translation and to produce corresponding, oppositely directed complementary pivotal movement of said mounting arms and thereby to move said clamping shoes between radially outwardly, disengaged and radially inwardly, engaged positions relative to the frame axis.

2. A tool as recited in claim 1, wherein:

said frame further comprises a mounting bar of generally rectangular configuration secured at a central portion thereof to said pair of support plates and extending therefrom in a generally horizontal direction transverse to the frame axis; and said guide means further comprises first and second guide fingers including corresponding first and second shank portions, said shank portions being received in corresponding, longitudinally extending recesses in opposite ends of said mounting bar so as to be oriented in alignment with each other, and said means for selectively actuating said guide fingers further comprises first and second air cylinders mounted on said corresponding first and second support plates and having respective first and second piston rods, first and second laterally extending recesses in the corresponding first and second ends of said mounting bar receiving said shank portions of said corresponding first and second guide fingers in laterally sliding relationship therein, first and second brackets mounted to said ends of said piston rods of said first and second air cylinders and having angularly oriented, corresponding slots therein, and first and second pins received through said angularly oriented slots of said corresponding first and second brackets and engaging said respective first and second shanks of said guide fingers, selective actuation of said first and second air cylinders moving the corresponding piston rods thereof between first and second vertically displaced positions and correspondingly moving said brackets and, through the slots thereof, the shanks of said first and second guide fingers between the extended and retracted positions thereof.

3. A method for selectively installing and removing a removable cruciform of a resiliently compressible type, in and from the interior of a generally cylindrical, elongated and vertically oriented ice containment structure, which interior is accessible from an open, upper end thereof, each such removable cruciform comprising a central housing defining an axis of compression and expansion, means normally biasing said housing in the direction of expansion, legs extending from said housing in a generally radially oriented direction and means on the outer edges of said legs configured to engage a corresponding stiffening ring rigidly secured on the interior of the cylindrical sidewall of the ice basket, comprising:

providing a handling tool having an elongated frame defining an axis, guide means connected to said frame and comprising at least first and second guide fingers extending radially from said axis and angularly displaced thereabout and selectively moveable between retracted and extended positions, and clamping means mounted to said frame and extending axially outwardly therefrom, said clamping means comprising a pair of clamping shoes selectively moveable in complementary directions relatively to the frame axis, radially inwardly to engaged positions and radially outwardly to disengaged positions, the radially outward and disengaged positions thereof being of lesser extent than the radially outward extent of said first and second guide fingers in either of said retracted and extended positions thereof;

positioning said tool, with said clamping shoes in said disengaged positions, in axial alignment with and disposed radially outwardly about the central housing of a removable cruciform of said resiliently compressible type;

selectively actuating said clamping means to said engaged positions of said clamping shoes for engaging and compressing the central housing of the cruciform and retracting the legs thereof;

lowering the tool with the cruciform engaged thereby, axially downwardly through the ice basket to a desired elevation;

selectively actuating said guide fingers of said tool to the extended positions thereof for engaging said guide fingers on a stiffening ring of the ice containment structure at the desired elevation;

selectively actuating the clamping means for moving said clamping shoes to the disengaged positions thereof to enable the central housing of the cruciform to expand and project the legs thereof radially outwardly for engaging the stiffening ring at the desired elevation;

selectively actuating said guide fingers to the retracted position thereof for releasing same from the stiffening ring; and vertically axially withdrawing the tool from within the ice containment structure.

4. A method as recited in claim 3, further comprising:

selectively actuating said guide fingers to the retracted positions thereof and said clamping shoes of said clamping means to said disengaged positions thereof;

lowering said tool axially downwardly within the interior of an ice containment structure so as to dispose the clamping shoes radially outwardly about and in surrounding relationship with respect to the central housing of an expansible cruciform disposed therein and with said frame received on the cruciform;

actuating said clamping shoes of said clamping means to engage and compress the central housing of the removable cruciform and retract the legs thereof from engagement with the stiffening ring of the ice containment structure; and axially withdrawing said tool with said engaged cruciform vertically upwardly through the open, upper end of the ice containment structure.

5. A handling tool comprising:

an elongated frame defining an axis;

guide means connected to said frame and comprising at least first and second guide fingers extending radially from said axis and angularly displaced thereabout and selectively moveable between retracted and extended positions;

clamping means mounted to said frame and extending axially outwardly therefrom, said clamping means comprising a pair of clamping shoes selectively moveable in complementary directions relatively to the frame axis, radially inwardly to engaged positions and radially outwardly to disengaged positions, the radially outward and disengaged positions thereof being of lesser extent than the radially outward extent of said first and second guide fingers in either of said retracted and extended positions thereof;

means for selectively moving said tool in a vertical axial direction to a desired elevational position within a vertically oriented and confining, generally cylindrical structure having a common vertical axis;

said guide means, with said guide fingers in said retracted positions thereof, permitting the selective moving of said handling tool in the common vertical axial direction through the vertically oriented and confining, generally cylindrical structure to and from a desired elevational position therewithin, the cylindrical structure having an interior diameter greater than the diameter defined by said first and second guide fingers in said retracted positions thereof and substantially the same as the diameter defined by said first and second guide fingers in said extended positions thereof;

means for remotely actuating said first and second guide fingers of said tool, when in the desired elevational position, to said extended positions thereof to engage the interior sidewall of the confining cylindrical structure at the desired elevational position therein, thereby to guide said clamping means to a common axial position within the cylindrical structure; and means for remotely actuating said clamping means of said tool, when at the desired elevational position within the cylindrical structure, for selective movement in the complementary, radially inward and radially outward directions to the respective engaged and disengaged positions thereof.

6. A system for selectively installing and removing a removable cruciform in and from the interior of a generally cylindrical, elongated and vertically oriented ice container structure having stiffening rings rigidly secured to, and on the interior of, the cylindrical sidewall of the ice containment structure, which interior is accessible from an open, upper end of the ice containment structure and has a predetermined interior diameter, comprising:

a removable cruciform comprising a resiliently compressible central housing defining an axis of compression and expansion, means normally biasing said housing in the direction of expansion, legs extending from said housing in a generally radially oriented direction and means on the outer edges of said legs for engaging a stiffening ring rigidly secured on the interior of the cylindrical sidewall of the ice containment structure; and a handling tool comprising:

a frame, guide means connected to said frame and comprising at least first and second guide fingers, selectively movable between retracted and extended positions defining corresponding diameters respectively less than and substantially the same as the interior diameter of the generally cylindrical sidewall of the ice containment structure, means for selectively actuating said guide fingers to the retracted positions thereof for permitting said movement of the tool axially through the ice containment structure, and to the extended positions thereof for engaging said guide fingers on a stiffening ring of the ice containment structure at a desired elevation within the ice containment structure at which said tool is positioned, clamping means connected to said frame and extending downwardly therefrom, means for selectively actuating said clamping means along an axis of movement between engaged and disengaged positions thereof, said clamping means, when disposed about a central housing of a cruciform with the axis of movement thereof aligned with the axis of compression and expansion of the cruciform and when actuated to said engaged position, compressing the central housing of the cruciform and retracting the legs thereof to less than the predetermined interior diameter to permit the cruciform to be moved axially through the ice containment structure in a horizontal orientation, and, when actuated to the disengaged position, enabling said central housing of the cruciform to expand along the axis of expansion and compression thereof and thereby to project the legs thereof radially outwardly for engaging a stiffening ring at the corresponding elevation thereby to install the cruciform at the corresponding elevation within the ice containment structure, and means connected to said frame for supporting therewith said guide means, said clamping means and said respective means for selectively actuating said guide fingers and said clamping means of said tool for supporting same and for selectively lowering and raising same to and from any desired elevation in an ice containment structure.

7. A removable cruciform handling tool for selectively installing and removing a removable cruciform of a resiliently compressible type, in and from the interior of a generally cylindrical, elongated and vertically oriented ice containment structure and which interior is accessible from an open, upper end of said ice containment structure, each such removable cruciform comprising a central housing defining an axis of compression and expansion, means normally biasing said housing in the direction of expansion, legs extending from said housing in a generally radially oriented direction and means on the outer edges of said legs for engaging a corresponding stiffening ring rigidly secured on the interior of the cylindrical sidewall of the ice containment structure, comprising:

a frame comprising a generally elongated and horizontally extending bar and a support connected thereto and extending axially downwardly therefrom;

guide means connected to said frame and comprising at least first and second guide fingers, selectively movable between retracted and extended positions;

means for selectively actuating said guide fingers to the retracted positions thereof for movement of the tool axially through the ice containment structure, and to the extended positions thereof for engaging said guide fingers on a stiffening ring of the ice containment structure at a desired elevation within the ice containment structure at which the tool is positioned;

clamping means connected to said frame and extending downwardly therefrom and comprising a pair of mounting arms pivotally connected to said downwardly extending support for common, complementary, pivotal movement and including respective actuating slots therein, and a pair of clamping shoes respectively, pivotally connected to said pair of mounting arms; and     means for selectively actuating said clamping means along an axis of movement between engaged and disengaged positions thereof and comprising an air cylinder secured to said downwardly extending support of said frame, said air cylinder having a piston rod extending axially downwardly therefrom, a clevis mounted on the free end of the piston rod, and a pin extending through said slots of said mounting arms and said clevis; said air cylinder being selectively actuable to drive said piston rod in reciprocating axial translation and to produce corresponding, oppositely directed complementary pivotal movement of said mounting arms and thereby to move said clamping shoes between the disengaged and engaged positions thereof, said clamping means, when disposed about a central housing in a cruciform with the axis of movement thereof aligned with the axis of compression and expansion of the cruciform and when actuated to said engaged position, compressing the central housing of the cruciform and retracting the legs thereof sufficiently to permit the cruciform to be moved axially through the ice containment structure in a horizontal orientation, and, when actuated to the disengaged position, enabling said central housing of the cruciform to expand along the axis of expansion and compression thereof and project the legs thereof radially outwardly for engaging a stiffening ring at the corresponding elevation thereby to install the cruciform at the corresponding elevation within the ice containment structure; and     connection means rigidly secured to said frame and adapted for engagement, for supporting therewith said guide means, said clamping means and the respective said means for selectively actuating said guide fingers of said guide means and said clamping means, and for selectively lowering and raising the same to and from any desired elevation in an ice containment structure.

8. A removable cruciform handling tool for selectively installing and removing a removable cruciform of a resiliently compressible type, in and from the interior of a generally cylindrical, elongated and vertically oriented ice containment structure and which interior is accessible from an open, upper end of said ice containment structure, each such removable cruciform comprising a central housing defining an axis of compression and expansion, means normally biasing said housing in the direction of expansion, legs extending from said housing in a generally radially oriented direction and means on the outer edges of said legs for engaging a corresponding stiffing ring rigidly secured on the interior of the cylindrical sidewall of the ice containment structure, comprising:

a frame comprising a generally elongated and horizontally extending bar, an elongated support connected thereto and extending axially downwardly therefrom and a mounting bar of generally rectangular configuration secured at a central portion thereof to said elongated support and extending therefrom in a traverse, generally horizontal direction, said mounting bar having first and second laterally extending recesses in the corresponding, opposite ends thereof and disposed to correspond to a diameter of an ice containment structure when said tool is positioned therein;

guide means connected to said frame and comprising at least first and second guide fingers, selectively movable between retracted and extended positions;

means for selectively actuating said guide fingers to the retracted positions thereof for movement of the tool axially through the ice containment structure, and to the extended positions thereof for engaging said guide fingers on a stiffening ring of the ice containment structure at a desired elevation within the ice containment structure at which the tool is positioned;

clamping means connected to said frame and extending downwardly therefrom;

means for selectively actuating said clamping means along an axis of movement between engaged and disengaged positions thereof, said clamping means, when disposed about a central housing of a cruciform with the axis of movement thereof aligned with the axis of compression and expansion of the cruciform and when actuated to said engaged position, compressing the central housing of the cruciform and retracting the legs thereof sufficiently to permit the cruciform to be moved axially through the ice containment structure in a horizontal orientation, and, when actuated to the disengaged position, enabling said central housing of the cruciform to expand along the axis of expansion and compression thereof and project the legs thereof radially outwardly for engaging a stiffening ring at the corresponding elevation thereby to install the cruciform at the corresponding elevation within the ice containment structure; and said first and second guide fingers further comprising corresponding first and second shank portions, said shank portions being received in laterally sliding relationship in the corresponding, laterally extending recesses in the opposite ends of said mounting bar so as to be oriented in alignment with each other and with a diameter of an ice containment structure on which said tool is disposed; and said means for selectively actuating said guide fingers further comprise:

first and second air cylinders mounted on said elongated support and having respective first and second piston rods, first and second brackets mounted on said ends of said piston rods of said first and second air cylinders and having angularly oriented, corresponding slots therein, and first and second pins received through said angularly oriented slots of said corresponding first and second brackets and engaging said respective first and second shanks of said guide fingers, selective actuation of said first and second air cylinders moving the corresponding piston rods thereof between first and second vertically displaced positions and correspondingly moving said brackets and, through the slots thereof, the shanks of said first and second guide fingers between extended and retracted postions relative to said mounting bar, corresponding to engage said guide fingers on a stiffening ring within said ice containment structure for supporting said tool thereon and to retract said guide fingers from any such retaining ring, thereby to permit movement of said tool axially through said ice containment structure to and from any given elevation therewithin.

* * * * *